April 26, 1966 W. E. ROGERS 3,248,628
SYSTEM FOR COORDINATED STARTING AND STOPPING ELECTRIC MOTORS
Filed Dec. 11, 1961
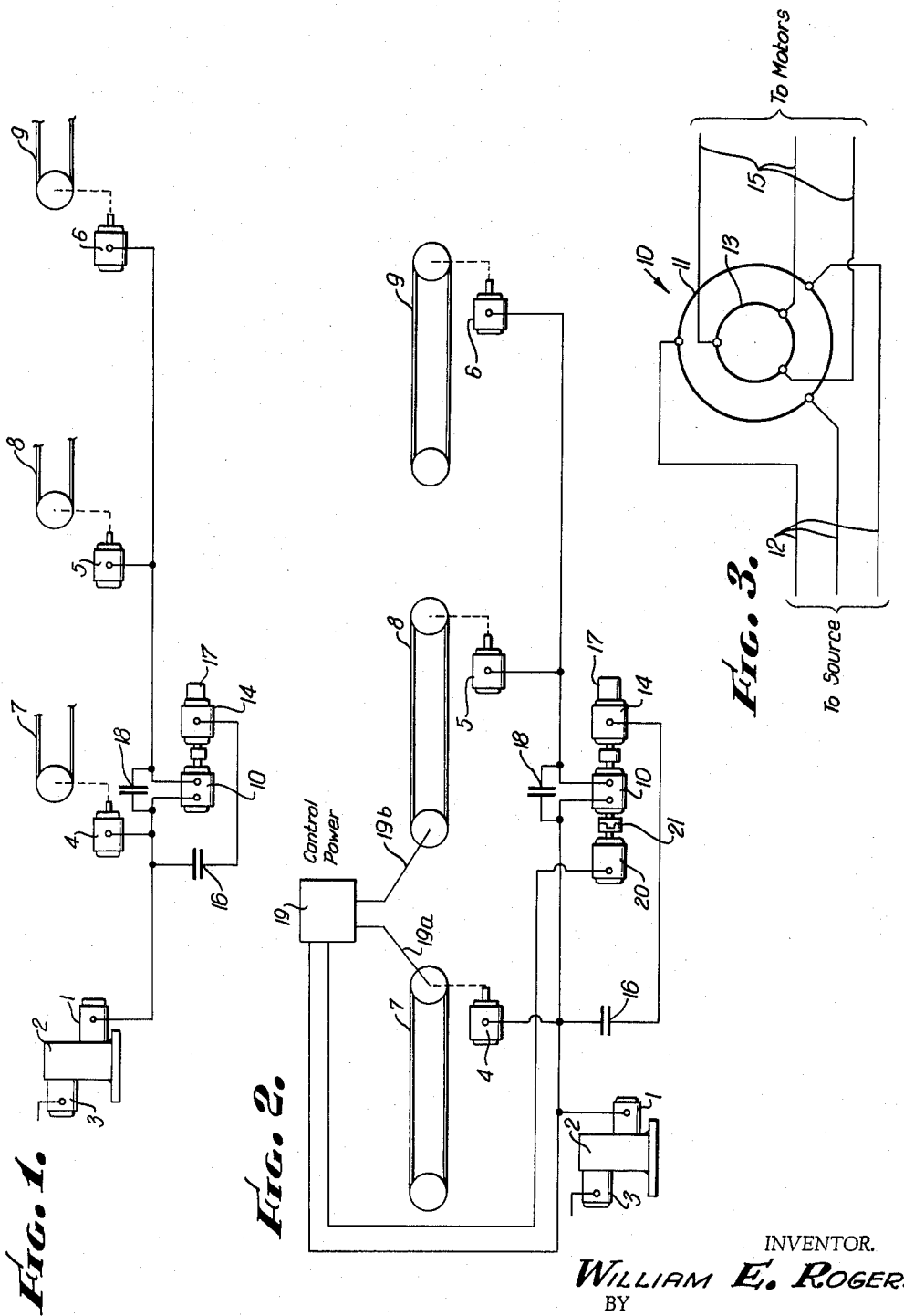
INVENTOR.
WILLIAM E. ROGERS
BY
Flam and Flam
ATTORNEYS.

United States Patent Office 3,248,628
Patented Apr. 26, 1966

3,248,628
SYSTEM FOR COORDINATED STARTING AND STOPPING ELECTRIC MOTORS
William E. Rogers, Southfield, Mich., assignor, by mesne assignments, to Emerson Electric Co., a corporation of Missouri
Filed Dec. 11, 1961, Ser. No. 158,400
2 Claims. (Cl. 318—231)

This invention relates to a system using electric power for moving a plurality of work carriers; such carriers may be conveyors or rotary work supports.

In some industries, it is necessary to slow down or stop one of the work carriers while another work carrier is moved at a normal speed. It is often necessary to synchronize the movement of the carriers when they are up to speed, as well as to make it possible to adjust the speed at which the carriers move.

The problem of maintain sufficiently accurate synchronization is to some extent solved by operating the load carriers by synchronous alternating current motors; and speed variation can be readily effected by providing an alternator as the source of power, which is driven at an adjustable speed.

It is also necessary when one or more of the load carriers are to be stopped or started, to ensure that they will stop in step, and will start in step, whereby the work carriers can be coordinated to correspond to the operations to be performed on the work.

It is one of the objects of this invention to provide such coordinated starting and stopping in a simple and effective manner.

It is another object of this invention to make it possible to effect these results even when the speed of the driving motors is adjusted, as by adjusting the frequency of the output of the alternator supplying the motors with electrical energy.

In some instances, when all of the work carriers are operating at synchronous speed, it is necessary to provide position synchronization. Such position synchronization and means for attaining it are described in an application having Serial No. 49,345, filed on August 12, 1960, in the name of John H. Wallace, and assigned to the same assignee as this application. It is another object of this invention to provide such position synchronization in conjunction with said coordinated starting and stopping of the work carriers.

This invention possesses many other advantages and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:
FIGURE 1 is a diagrammatic illustration of a system incorporating the invention;
FIG. 2 is a diagrammatic illustration of a modified form of the invention; and
FIG. 3 is a diagram of an electrical differential utilized in connection with the invention.

In the form shown in FIG. 1, there is shown an alternator 1 driven by a speed changing device 2, operated by any acceptable form of motive power, such as an induction motor 3.

The alternator 1 is arranged to supply electrical energy to a plurality of synchronous or induction motors 4, 5 and 6. Each of these motors is shown as operating a moving work carrier, such as the conveyors 7, 8 and 9.

The speed changer 2 may be one which utilizes variable diameter pulleys, as illustrated, for example, in Patent No. 2,398,235, issued April 9, 1946.

It may be necessary to maintain the operation of the work carrier 7 while work carriers 8 and 9 are temporarily stopped. If the driving motors 5 and 6 would be merely disconnected from the source 1, they would come to rest in uncoordinated fashion, due to vagaries of the motors, such as frictional resistance, etc. Similarly, upon starting the motors 5 and 6 the vagaries of the motors and the loads operated thereby would not coordinate the start so as to result in true alignment between the work carriers 7, 8 and 9.

In order to make it possible to start and stop one or more of the motors 5 and 6 in coordinated manner, use is made of a frequency changer device 10. This may be in the form of an electric differential illustrated diagrammatically in FIG. 3. Such differential devices include a stator winding 11 preferably of multiphase type, as indicated by the three-phase mains 12, fed from alternator 1. The rotor 13 is arranged to be driven by a synchronous motor 14 as indicated in FIG. 1.

The rotor 13 also has a three-phase winding and supplies output mains 15. It is well-known that when a rotor such as 13 has a multiphase winding such as to produce the same number of poles as the stator winding 11, then the frequency of the current generated in the rotor, when the rotor is angularly moved, is proportional to the difference in the speed of the rotor and that of the rotating field produced by the stator winding 11.

The synchronous motor 14, when the system is operating with motors 5 and 6 rotating, is at a standstill. Due to the rotating field produced by the stator winding 11, the output mains 15 deliver a current at the same frequency as that of the input mains 12. Accordingly, the motors 5 and 6 operate in coordination with the motor 4 and in step therewith.

If it is desired to stop the rotation of motors 5 and 6, the motor 14 is energized by closing of the switch contacts 16, whereby alternator 1 supplies electrical energy to the motor 14. The motor 14 has the same number of poles as the electrical differential 10; since both the stator winding 11 and the motor 14 are energized from the alternator 1, the motor 14 rotates at the same speed and same direction as the rotating field produced by the stator 10. Accordingly, the frequency at the output mains 15 is reduced to zero and the motors 5 and 6 come to standstill but remain in step with each other during this stopping period.

When it is desired to start the motors 5 and 6 in coordinated fashion, the switch 16 is opened so as to bring the motor 14 gradually to standstill.

When that is achieved, the frequency of the output mains 15 of differential 10 will be the same as the output of alternator 1.

An electromagnetic or other type of brake structure 17 is used in connection with the motor 14 and brings the motor 14 to rest gradually after motor 14 is deenergized. Since such devices are well-known, further description of the brake 17 is considered unnecessary.

Alternatively, when it is desired to maintain energization of motors 5 and 6, they may be maintained energized directly from the alternator 1 by the aid of a switch 18 which shunts the differential 10. When switch 18 is closed the motor 14, of course, is deenergized.

In some instances, it is desirable that the relative angular positions of the shafts of the motors 4, 5 and 6 be maintained at definite fixed values. Under such circumstances, the system shown in FIG. 2 may be utilized. Here, a control system 19 is provided, mechanically connected to the motors 4 and 5, as by connections 19a and 19b. This system 19 responds to any deviation from position synchronization. When there is such a deviaton beyond tolerable limits, an auxiliary motor 20 is energized and brake 17 is released. This motor is then coupled, as by the aid of a coupling 21, to the rotor of the differential 10. The motor 20 can rotate in either direction at a relatively low speed in response to the deviation, to provide a speed up or a slow down of motors 5 and 6. This is due to the change in the frequency of the energy operating motors 5 and 6. When position synchronization is attained, the motor 20 is automatically deenergized. The coupling 21 may be disengaged while motor 20 is deenergized. The motor 14 during these controlling operations, is left unenergized.

When the deviation is below the limits of tolerance the system operates in a manner exactly like that illustrated in FIG. 1. When the deviation is sensed by the connections 19a and 19b to the sensing device 19, the motor 20 is energized as before stated. During this period the switch 16, that is used to energize motor 14, is open.

The inventor claims:

1. In a system for coordinated operation of substantially synchronous electrical motors: a source of alternating current; a first load operating motor connected to said source; an electrical differential having an input side connected to said source, an output side, and a substantially synchronous driving motor operating said differential; said differential output having a frequency corresponding to that of the source when the driving motor is at rest; means for optionally connecting said driving motor to said source; a plurality of load operating motors supplied with electriacl energy from the differential output; and means for attaining position synchronization between the first motor connected to the source and one of the said plurality of motors that are supplied with energy from the differential, including a correction motor for driving the differential and optionally coupled to the differential.

2. The combination as set forth in claim 1, with the addition of means for gradually applying a braking force to the driving motor in response to deenergization of said driving motor.

References Cited by the Examiner
UNITED STATES PATENTS

| 755,824 | 3/1904 | Woodridge | 318—171 |
| 2,394,480 | 2/1946 | Read | 318—171 X |
| 2,782,349 | 2/1957 | Sharp | 318—231 |
| 2,895,096 | 7/1959 | Wallace | 318—231 |

FOREIGN PATENTS

| 262,085 | 11/1927 | Great Britain. |
| 753,195 | 7/1956 | Great Britain. |
| 95,136 | 12/1920 | Switzerland. |

ORIS L. RADER, *Primary Examiner.*

MILTON O. HIRSHFIELD, JOHN F. COUCH,
*Examiners*

C. E. ROHRER, G. RUBINSON, *Assistant Examiners.*